(12) United States Patent
Chabinsky et al.

(10) Patent No.: US 9,146,303 B2
(45) Date of Patent: Sep. 29, 2015

(54) FOURIER TRANSFORM-BASED JAMMING TECHNIQUES

(75) Inventors: Jordan S. Chabinsky, Nashua, NH (US); Jeffrey L. Jew, Brookline, NH (US); Philip Soletsky, Brookline, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 498 days.

(21) Appl. No.: 13/444,912

(22) Filed: Apr. 12, 2012
(Under 37 CFR 1.47)

(65) Prior Publication Data
US 2015/0177365 A1    Jun. 25, 2015

Related U.S. Application Data

(60) Provisional application No. 61/480,906, filed on Apr. 29, 2011.

(51) Int. Cl.
*G01S 7/495* (2006.01)
*H04K 3/00* (2006.01)
(Continued)

(52) U.S. Cl.
CPC ............... *G01S 7/4804* (2013.01); *F41G 7/224* (2013.01); *G01S 7/495* (2013.01); *F41H 13/0056* (2013.01)

(58) Field of Classification Search
CPC ............... G01S 7/02; G01S 7/38; G01S 7/48; G01S 7/4804; G01S 7/495; H04K 3/00; H04K 3/40; H04K 3/41; H04K 3/42; H04K 3/43; H04K 3/44; H04K 3/45; H04K 3/46; H04K 3/60; H04K 3/62; H04K 3/65; H04K 3/80; H04K 3/82; H04K 3/825; H04K 3/827; F41G 7/20; F41G 7/22; F41G 7/224; F41H 13/0043; F41H 13/005; F41H 13/0056
USPC ............... 398/39; 455/1; 342/13–20, 82, 165, 342/173–175, 192–197; 375/211, 316, 346
See application file for complete search history.

(56) References Cited

U.S. PATENT DOCUMENTS 4,581,767 A * 4/1986 Monsen .......................... 342/14
5,128,679 A * 7/1992 Moffat ............................ 342/13

(Continued)

*Primary Examiner* — Bernarr Gregory
(74) *Attorney, Agent, or Firm* — Finch & Maloney PLLC; Neil F. Maloney

(57) ABSTRACT

Techniques are disclosed for producing and/or optimizing jamming codes for use in directional infrared countermeasures (DIRCM) systems. In some embodiments, Fourier analysis may be implemented to produce jamming codes which more efficiently (e.g., time efficient, power efficient) and/or more reliably (e.g., no frequency gaps) achieve optical break-lock (OBL) of infrared (IR)-seeking missiles/threats over a broad range of frequencies (e.g., short-wavelength IR, mid-wavelength IR), as compared to heritage jamming code methodologies. Some embodiments may be implemented in military/defense applications (e.g., protection of military/tactical aircraft or other vehicles); some other embodiments may be implemented in non-military/commercial applications (e.g., protection of domestic, civilian, and/or commercial aircraft or other vehicles). Some embodiments may be implemented to protect against IR-seeking air-to-air missiles (AAMs), surface-to-air missiles (SAMs), and/or man-portable air-defense systems (MANPADS/MPADS). Numerous configurations and variations will be apparent in light of this disclosure.

20 Claims, 3 Drawing Sheets

(51) Int. Cl.
   *G01S 7/48* (2006.01)
   *F41G 7/22* (2006.01)
   *G01S 7/00* (2006.01)
   *F41H 13/00* (2006.01)

(56) References Cited

U.S. PATENT DOCUMENTS

| | | | | |
|---|---|---|---|---|
| 5,378,155 A | * | 1/1995 | Eldridge | 342/14 |
| 5,406,286 A | * | 4/1995 | Tran et al. | 342/13 |
| 5,457,460 A | * | 10/1995 | Tran et al. | 342/13 |
| 5,549,477 A | * | 8/1996 | Tran et al. | 342/13 |
| 6,091,523 A | * | 7/2000 | Brandstetter | 398/39 |
| 6,697,007 B2 | * | 2/2004 | Greer | 342/13 |
| 7,095,779 B2 | * | 8/2006 | Karlsson | 342/14 |
| 7,427,947 B1 | * | 9/2008 | Dark et al. | 342/173 |
| 7,511,657 B2 | * | 3/2009 | Dark et al. | 342/173 |
| 7,512,197 B2 | * | 3/2009 | Furman et al. | 375/346 |
| 7,515,096 B2 | * | 4/2009 | Dark et al. | 342/173 |
| 7,609,748 B2 | * | 10/2009 | Karlsson | 455/1 |
| 7,737,883 B2 | * | 6/2010 | Dark et al. | 342/173 |
| 7,809,047 B2 | * | 10/2010 | Kummetz | 375/211 |
| 7,847,723 B1 | * | 12/2010 | Dark et al. | 342/173 |
| 7,893,866 B2 | * | 2/2011 | Dark et al. | 342/173 |

* cited by examiner

FOURIER TRANSFORM-BASED JAMMING TECHNIQUES

CROSS-REFERENCE TO RELATED APPLICATIONS

This application claims benefit of U.S. Provisional Patent Application Ser. No. 61/480,906, filed on Apr. 29, 2011. Each patent and patent application cited herein is hereby incorporated by reference in its entirety.

FIELD OF THE DISCLOSURE

The invention relates to infrared countermeasures (IRCM), and more particularly, to directional IRCM (DIRCM) jamming techniques.

BACKGROUND

Infrared (IR)-seeking (heat-seeking) missiles typically are designed to lock onto a source of IR radiation, such as an aircraft's engine. Upon achieving lock-on, componentry of the IR-seeking missile directs the missile along a path in an attempt to intercept (e.g., hit) the targeted IR source. In some cases, the targeted source (e.g., an aircraft or other vehicle) may include an infrared countermeasures (IRCM) system that detects and attempts to eliminate or otherwise mitigate the threat of the impending IR-seeking missile. However, there are a number of non-trivial issues that can arise which complicate the effective implementation of IRCM.

SUMMARY

One example embodiment of the present invention provides a method including the steps of performing a Fourier transform or a fast Fourier transform (FFT) of a candidate jamming code to produce a frequency spectrum and estimating a response of a missile/threat to the candidate jamming code. In some cases, the candidate jamming code is provided based on at least one of power and/or time constraints of a countermeasure system configured to implement the candidate jamming code, the missile/threat to which the jamming code will be applied, and/or susceptibility data of the missile/threat. In some cases, estimating the response of the missile/threat to the jamming code comprises comparing susceptibility data of the missile/threat to the frequency spectrum of the candidate jamming code. In some cases, the missile/threat comprises a short-wavelength infrared (SWIR)-seeking missile/threat or a mid-wavelength infrared (MWIR)-seeking missile/threat. In some cases, the method further includes the step of performing a Fourier transform or a FFT of one or more code segments of the candidate jamming code. In some such cases, the method further includes the step of comparing segment phases and/or magnitudes of the one or more code segments against each other to identify constructive/destructive interference behavior. In some such cases, the method further includes the step of applying results of the Fourier transform or FFT of the one or more code segments of the candidate jamming code to the candidate jamming code to produce a refined jamming code. In some such cases, the refined jamming code has a shorter duration than that of the candidate jamming code. In some other such cases, the refined jamming code has a different spectral energy allocation from that of the candidate jamming code. In some other such cases, the refined jamming code has no gaps in frequency coverage caused by destructive interference. In some cases, the refined jamming code at least one of reduces the time required to achieve optical break-lock (OBL) of the missile/threat, reduces the output power required to achieve OBL of the missile/threat, and/or increases the likelihood of achieving OBL of the missile/threat. In some cases, the method further includes the step of performing a Fourier transform or a FFT of the refined jamming code.

Another example embodiment of the present invention provides a computer readable medium for storing executable instructions thereon that, when executed by one or more processors, cause a method for refining a jamming code, the method including the steps of performing a Fourier transform or a fast Fourier transform (FFT) of a candidate jamming code to produce a frequency spectrum and estimating a response of a missile/threat to the candidate jamming code. In some cases, estimating the response of the missile/threat to the jamming code comprises comparing susceptibility data of the missile/threat to the frequency spectrum of the candidate jamming code. In some cases, the method further includes the step of performing a Fourier transform or a FFT of one or more code segments of the candidate jamming code. In some such cases, the method further includes the step of comparing segment phases and/or magnitudes of the one or more code segments against each other to identify constructive/destructive interference behavior. In some such cases, the method further includes the step of applying results of the Fourier transform or FFT of the one or more code segments of the candidate jamming code to the candidate jamming code to produce a refined jamming code. In some such cases, the method further includes the step of performing a Fourier transform or a FFT of the refined jamming code.

Another example embodiment of the present invention provides a method including the steps of performing a Fourier transform or a fast Fourier transform (FFT) of a candidate jamming code to produce a frequency spectrum and estimating a response of an infrared-seeking missile/threat to the candidate jamming code by comparing susceptibility data of the missile/threat to the frequency spectrum of the candidate jamming code. In some cases, the method further includes the steps of performing a Fourier transform or a FFT of one or more code segments of the candidate jamming code, comparing segment phases and/or magnitudes of the one or more code segments against each other to identify constructive/destructive interference behavior, and applying results of the Fourier transform or FFT of the one or more code segments of the candidate jamming code to the candidate jamming code to produce a refined jamming code, wherein the refined jamming code at least one of reduces the time required to achieve optical break-lock (OBL) of the missile/threat, reduces the output power required to achieve OBL of the missile/threat, and/or increases the likelihood of achieving OBL of the missile/threat.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
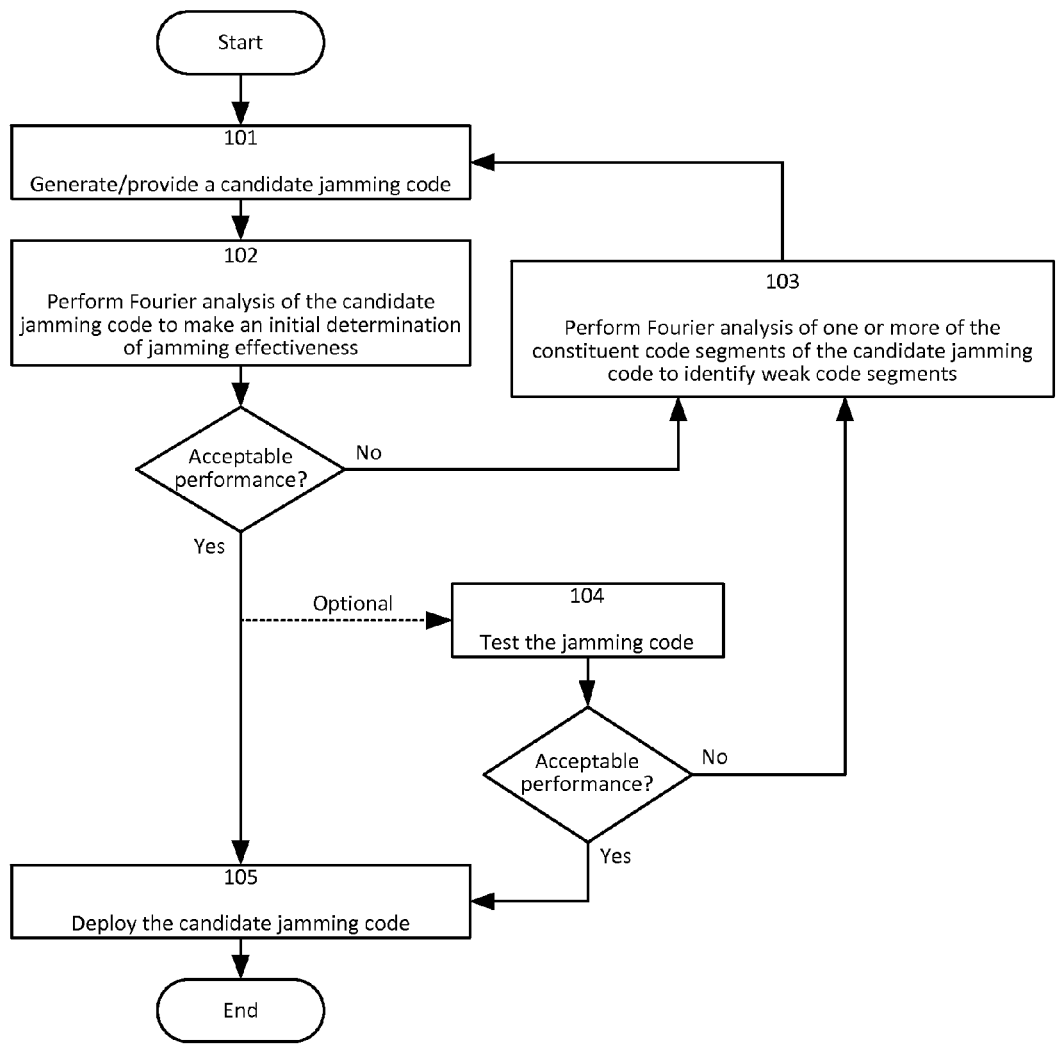
FIG. 1 is a flow diagram illustrating a method of refining a jamming code by application of Fourier analysis in accordance with an embodiment of the present invention.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Techniques are disclosed for producing and/or optimizing jamming codes for use in directional infrared countermeasures (DIRCM) systems. In some embodiments, Fourier analysis may be implemented to produce jamming codes which more efficiently (e.g., time efficient, power efficient) and/or more reliably (e.g., no frequency gaps) achieve optical break-lock (OBL) of infrared (IR)-seeking missiles/threats over a broad range of frequencies (e.g., short-wavelength IR, mid-wavelength IR), as compared to heritage jamming code methodologies. Some embodiments may be implemented in military/defense applications (e.g., protection of military/tactical aircraft or other vehicles); some other embodiments may be implemented in non-military/commercial applications (e.g., protection of domestic, civilian, and/or commercial aircraft or other vehicles). Some embodiments may be implemented to protect against IR-seeking air-to-air missiles (AAMs), surface-to-air missiles (SAMs), and/or man-portable air-defense systems (MANPADS/MPADS). Numerous configurations and variations will be apparent in light of this disclosure.

General Overview

Modern infrared (IR)-seeking (heat-seeking) missiles (e.g., air-to-air missiles or AAMs; surface-to-air missiles or SAMs) may employ IR guidance/homing systems designed to detect and lock onto IR radiation emanating from a given target source and to maintain lock-on while the missile is guided to intercept (e.g., hit) that target. This may be achieved by including a seeker head or other sensor package designed to target, for example, sources of short-wavelength IR (SWIR) signals (e.g., spectral band of about 1-3 µm) and/or mid-wavelength IR (MWIR) signals (e.g., spectral band of about 3-5 µm). IR-seeking missiles may be launched/fired by a variety of systems/platforms, including, but not limited to: aircraft (e.g., tactical/military aircraft); man-portable air-defense systems (MANPADS or MPADS); and/or other suitably configured devices/vehicles. In a given engagement scenario, an IR-seeking missile can acquire and intercept a target source of IR radiation in as little as about 2-10 s, for example.

The seeker componentry of an IR-seeking missile varies depending on the mode of operation for detecting the IR radiation. If the seeker head employs spin scanning to detect IR radiation, then the seeker componentry typically includes optics (e.g., a gyroscopic telescope, focusing optics, and/or a collimating lens, etc.) configured to collect and focus/convey IR energy onto a spinning, patterned reticle. This reticle modulates the IR energy, which is then projected onto an IR-sensitive detector. This detector generates a time-varying electrical signal used in directing/guiding the IR-seeking missile to its target.

If instead the seeker head employs conical scanning to detect IR radiation, then the seeker componentry typically includes optics, for example, configured like those of a Cassegrain reflector/telescope having a rotating, off-axis secondary (tracking) mirror. Reflection of the collected IR energy off of the rotating tracking mirror produces a rotating image (e.g., rotated in a circular fashion) that is focused/conveyed onto a fixed/stationary reticle. As before, the reticle serves to modulate the IR energy, which is then projected onto an IR-sensitive detector. This detector generates a pulsed electrical signal used in directing/guiding the IR-seeking missile to its target.

In either instance, the resultant electrical signal has features (e.g., amplitude and frequency) that are proportional to the pointing error angle between the seeker head and the target source of IR radiation. The IR-seeking missile's tracking logic processes the electrical signal and determines the location of the target source of IR radiation relative to the missile's direction of flight. Typically, the electrical signal is processed through two electrical control loops: (1) the track loop; and (2) the guidance loop. The track loop normally is used to maintain the pointing of the gyroscopic telescope and acts to reduce the measured error angle between the seeker head and the target source of IR radiation. The guidance loop normally is used to maintain the pointing of the missile body and acts to steer the IR-seeking missile to a predicted intercept point based on the perceived target motion.

A variety of electronic countermeasures (ECM) may be implemented to thwart IR-seeking missiles. Infrared countermeasures (IRCM) are one modern type of ECM. IRCM systems may be used to detect, track, and/or disable a detected IR-seeking missile. Tactical/military aircraft, for example, may employ IRCM to first provide threat awareness through the detection of radiant IR emissions from potential threats (e.g., a thermal plume, as from launching an IR-seeking SAM/AAM). Once detected, the location of the threat/missile can be communicated to other componentry/subsystems of the IRCM system which are designed to defeat, confuse, or otherwise disable the missile's IR guidance system. Typically, IRCM systems use a modulated source of IR radiation that has a higher intensity than the IR signature of the targeted source. The impending missile's seeker componentry may be overwhelmed by this higher intensity, modulated IR signal, and consequently the missile may be steered off course or otherwise forced to deviate from the originally intended target.

Directional IRCM (DIRCM) are another type of modern ECM. DIRCM systems may employ, among other componentry, an IR light source (jamming device), such as a laser-based IR jammer (e.g., Agile Eye-II, by BAE Systems), which is designed to direct/aim a beam of laser light (e.g., IR energy) into the optics of the seeker head of an approaching IR-seeking missile/threat in an effort to actively jam the missile's IR guidance system. The laser light may be modulated in such a way as to simulate the error signal of the IR-seeking missile and thus create one or more virtual (false) targets within the missile's field of view (FOV). These simulated error signals—known as jamming codes—effectively cause the IR-seeking missile to steer its tracking mirror away from the target and to instead track one of the false virtual targets. The laser-based IR jammer may implement a higher power laser and/or utilize stray light paths so as to generate a more powerful signal than the true error signal associated with the originally intended target. This generated signal is used to steer the IR-seeking missile's seeker componentry to a position where it can no longer see the originally targeted IR radiation source. In some cases, successful use of IRCM/DIRCM may cause an IR-seeking missile, for instance, to violently and instantaneously steer away from its target upon seeing the jamming laser IR signal.

A missile is said to be in a condition of optical break-lock (OBL) when its originally intended target is no longer within the IR-seeking missile's FOV. Modern IR jammers utilize OBL as a primary mechanism for defeating IR-seeking missiles. Generally, OBL is achieved by commanding the tracking mirror (e.g., in the case of a seeker head that employs conical scanning) to look at a position other than the originally intended target and thus cause the IR-seeking missile to be steered away to a point where the originally intended target is outside of its FOV. In general, the fastest possible OBL may be produced by designing the primary jamming frequency of the jamming code to match/be equivalent to the missile spin frequency of the IR-seeking missile. As a result, the jamming code produces straight line motion from the missile seeker head, thus ensuring the quickest OBL (e.g., the target leaves the IR-seeking missile's FOV in a minimal amount of time).

However, there are a number of non-trivial issues associated with achieving OBL of an IR-seeking missile/threat. For example, direct knowledge of the missile spin frequency typically is unavailable in most real-world situations (e.g., combat or other military engagement scenarios). Instead, it is much more likely that a jamming code will include a primary jamming frequency that does not equal the missile spin frequency, and so the missile seeker head will oscillate at a rate that is proportional to the difference between the primary jamming frequency and the missile spin frequency, but the IR-seeking missile will not necessarily be readily/successfully steered off course. In some such cases, if the difference is sufficiently small, an OBL may be achieved, albeit with an increase in time and/or power, whereas in some other cases in which the difference is sufficiently large, OBL may not be achieved (e.g., insufficient perturbation of missile flight) and the target may be intercepted (e.g., hit).

Another non-trivial issue pertains to the fact that OBL of some MWIR-seeking missiles takes significant jammer power. As will be appreciated, this may be, in part, because of the use of more advanced electronics in seeker heads implemented for MWIR applications as opposed to SWIR applications.

Yet another non-trivial issue pertains to the fact that heritage jamming code methodologies generally have assumed that separate missiles/threats are to be considered independent of one another. Consequently, heritage methodologies have focused on the development of individual, independent jamming code segments directed toward each of such singular/autonomous missiles/threats. As will be appreciated, this increase in the number of jamming code segments required to address multiple/different threat types increases the overall length of the jamming code and consequently the amount of time needed to defeat such impending threats, whereas, as previously noted, the time frame in which a modern IR-seeking missile can acquire and intercept a target remains relatively brief (e.g., about 2-10 s). Furthermore, different segments of the jamming code may command opposite motions at a specific missile spin frequency and thus effectively cancel each other out. Consequently, conventional techniques (e.g., linear sweeps over frequency) may fail to generate full coverage of the frequency band due to self-induced destructive interference of the jamming code.

Therefore, there is need for techniques for producing jamming codes capable of reliably achieving OBL in an IR-seeking missile/threat over a broad range of frequencies (e.g., SWIR and/or MWIR) and/or in a more time-efficient and/or power-efficient manner than is achievable with heritage methodologies.

Thus, and in accordance with an embodiment of the present invention, techniques are disclosed for implementing Fourier analysis techniques (e.g., Fourier transforms) to predict and/or optimize the effectiveness of a given jamming code in achieving OBL of one or more IR-seeking missiles/threats. In accordance with an embodiment, Fourier analysis techniques disclosed herein may be implemented, for example, to provide analytical information which may be useful in tuning/refining and/or otherwise optimizing a given jamming code and/or generating/building an optimized jamming code.

As will be appreciated, a Fourier transform may be used to map a mathematical function that is originally expressed in one domain (e.g., time domain) into another domain (e.g., frequency domain). Mapping of a time-based function to a frequency-based function produces a frequency spectrum. Accordingly, a Fourier transform may be performed to decompose an arbitrary waveform into a spectrum of frequency components expressed in terms of sines and cosines, for example.

As will further be appreciated, a fast Fourier transform (FFT) is an algorithm that may be used to compute, for instance, the discrete Fourier transform (DFT) of a mathematical function (assuming a discrete input function). A DFT decomposes a sequence of values into components of different frequencies. Given a finite set of data points (e.g., a periodic sampling taken from a signal), the FFT expresses the data in terms of its component frequencies.

Thus, and in accordance with an embodiment, Fourier analysis (e.g., Fourier transform, digital implementation of a Fourier transform, fast Fourier transform, etc.) may be applied to a given jamming code to produce its frequency spectrum. As will be appreciated in light of this disclosure, the Fourier transform (e.g., standard Fourier transform, FFT, etc.) of a jamming code may be performed in much the same way as would be done for any arbitrary waveform. As previously noted, the FFT utilizes a finite set of data points to produce a frequency spectrum that expresses the data in terms of its component frequencies. Thus, in one specific example embodiment, a periodic sampling may be taken, for instance, at equally spaced intervals between 0-100 kHz, where the number of data points in the periodic spacing equals the number of points in the original time domain. Other suitable sampling intervals will depend on a given application and will be apparent in light of this disclosure.

In some embodiments, Fourier analysis may be implemented to realize a jamming code that is more time-efficient (e.g., achieves OBL in a more expeditious manner). For example, the results of Fourier analysis of a given jamming code may be utilized, in accordance with an embodiment, to: (1) reduce the length of one or more individual segments of the jamming code; (2) reduce the overall length of the jamming code; and/or (3) produce suitably flexible jamming codes having cooperative jamming code segments, which may help to realize shorter time requirements for defeating impending IR-seeking missiles/threats.

In some embodiments, Fourier analysis may be implemented to realize a jamming code that is more power-efficient (e.g., achieves OBL with less excess/wasted IR energy). For example, the results of Fourier analysis of a given jamming code may be utilized, in accordance with an embodiment, to: (1) more efficiently allocate the jamming code spectral energy (e.g., IR energy) to address multiple IR-seeking missile/threat frequencies; and/or (2) more efficiently divide power output to address multiple IR-seeking missiles/threats.

In some embodiments, a jamming code which has been refined/optimized in light of the results of Fourier analysis thereof may realize more efficient/expedited coupling of its spectral energy (e.g., IR energy) into the tracking loop of the IR-seeking missile/threat. In some such cases, this may increase the likelihood of successfully achieving OBL of a given IR-seeking missile/threat.

In accordance with an embodiment, Fourier analysis may be implemented to develop jamming codes which address missile/threat frequencies which those missiles/threats do not explicitly generate. As will be appreciated, short bursts of single-frequency jamming codes may generate a wider band of frequency content than the explicit jamming code frequency commanded. Therefore, in accordance with an embodiment, wide frequency bands may be covered with several dwelling code segments held at discrete frequencies for a given period of time rather than with a single linear sweep over the entire frequency band. Thus, and in accordance with an embodiment, Fourier analysis may be implemented to generate jamming codes which: (1) cover a variety of frequencies so as to accommodate multiple missile/threat types (e.g., which may have multiple missile spin frequencies); and/or (2) cover a variety of frequencies so as to accommodate missiles/threats which change spin frequency over the duration of an engagement (e.g., because the rate of changes in missile spin frequency generally is slow as compared to the duration of a jamming code).

In some embodiments, Fourier analysis may be implemented to develop jamming codes of shorter duration. In one specific example embodiment, the overall length of a jamming code may be reduced to the range of about 1-5 s (e.g., about 2 s), thus representing approximately a 5-10% improvement over jamming codes produced by heritage methodologies.

In some embodiments, Fourier analysis may be implemented to develop jamming codes which exhibit a reduction in power. In one specific example embodiment, the power output for a jamming code may be reduced by a factor of about 2-10 (e.g., about 2-4) as compared to jamming codes produced by heritage methodologies.

In some embodiments, Fourier analysis may be implemented to develop jamming codes which exhibit a reduction in self-induced destructive interference. Also, in some embodiments, Fourier analysis may be implemented to develop jamming codes which account for and leverage the interference of harmonics within a given jamming code that comprises multiple code segments spanning multiple frequencies across a period of time.

As will be appreciated, expedited achievement of OBL of a given missile/threat (e.g., by optimized jamming code content, by reduction in jamming code length, by more efficient spectral energy allocation, etc.) in accordance with some embodiments of the present invention may realize a reduction in the run time and/or power consumption of a DIRCM system implementing such jamming codes. Thus, and in accordance with an embodiment, a reduction in the power requirements of a system (e.g., DIRCM) implementing such jamming codes may be realized.

While numerous embodiments of the present invention may be implemented, for example, in military/defense applications (e.g., protection of military/tactical aircraft or other vehicles against IR-seeking threats, such as AAMs and/or SAMs), the claimed invention is not so limited. For instance, embodiments of the present invention may be implemented in non-military/commercial applications, such as, but not limited to, providing countermeasures (e.g., IRCM, DIRCM, counter-MANPADS, etc.) for the protection of domestic, civilian, and/or commercial aircraft or other vehicles. Furthermore, and in accordance with an embodiment, techniques disclosed herein may be performed, for example, in a laboratory/testing context and/or by on-board logic/componentry. Numerous applications will be apparent in light of this disclosure.

Fourier Transform-Based Jamming Code Methodology

Figure 1A:
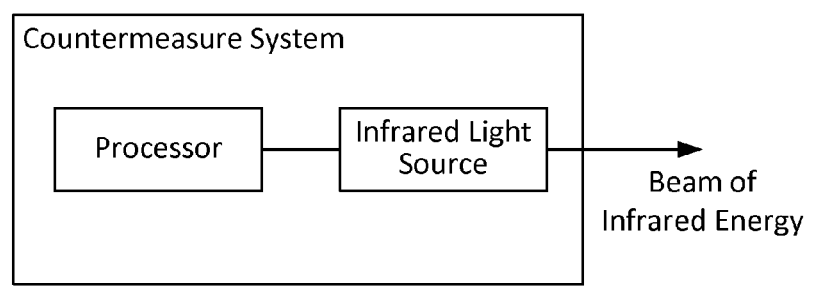
FIG. 1A is a block diagram illustrating a countermeasure system configured in accordance with and embodiment of the present invention.

FIG. 1 is a flow diagram illustrating a method of refining a jamming code by application of Fourier analysis in accordance with an embodiment of the present invention. FIG. 1A is a block diagram illustrating a countermeasure system configured in accordance with an embodiment of the present invention. As will be appreciated, and in accordance with an embodiment, one or more portions of the process flow depicted in FIG. 1 may be, for example, repeated/iterated several times over or performed only once, to optimize a given candidate jamming code before deployment thereof.

Beginning with block 101, generate or otherwise provide a candidate jamming code. In accordance with an embodiment, a number of factors may be considered in generating/providing a given candidate jamming code, including, but not limited to: (1) power and/or time constraints of the countermeasure system (e.g., IRCM/DIRCM, etc.) that is to implement the jamming code and/or of the platform (e.g., aircraft, vehicle, etc.) implementing such a countermeasure system; (2) the particular missile(s)/threat(s) of concern to which the jamming code will be applied, which may be made known or otherwise predicted based on, for example, user input and/or intel analysis; and/or (3) the susceptibility data (e.g., missile spin frequency spectra) of those missiles/threats, which may be made known or otherwise provided, for example, by analysis/testing and/or user reports. Other relevant factors/considerations for providing a candidate jamming code will depend on a given application and will be apparent in light of this disclosure.

Continuing with block 102, perform Fourier analysis of the candidate jamming code (e.g., via a processor of a countermeasure system, as in FIG. 1A) to make an initial determination of jamming effectiveness. As will be appreciated, the effectiveness of a given jamming code may be related, at least in part, to how expeditiously/efficiently the jamming code spectral energy (e.g., IR energy output by an IR light source of a countermeasure system, such as that in FIG. 1A) is coupled, for example, into the missile/threat's seeking componentry (e.g., an IR-seeking missile's tracking loop).

In accordance with an embodiment, Fourier analysis may be implemented to estimate/assess the effectiveness of a given jamming code in achieving OBL with regard to one or more missiles/threats. For instance, in some embodiments, the frequency spectrum (e.g., resultant from the Fourier transform) of the candidate jamming code may be compared, for example, with one or more of the considerations/factors noted above with reference to block 101 (e.g., countermeasure system and/or platform constraints, the listing of relevant missiles/threats, and/or the susceptibility data/curves of relevant missiles/threats).

In some embodiments, the frequency spectrum magnitude may be compared against the susceptibility data/curve of one or more missiles/threats across a given frequency band of interest, and thus the response of that missile/threat to that jamming code may be estimated/predicted (e.g., via a processor of a countermeasure system, as in FIG. 1A). In some cases, the Fourier transform of a given jamming code may account for the entirety of the missile/threat frequency band and/or the relative response of the missile susceptibility curve from frequency to frequency. Also, in accordance with an embodiment, comparison of the frequency spectrum of the candidate jamming code with the susceptibility data/curve (e.g., via a processor of a countermeasure system, as in FIG. 1A) may help to identify weak points (e.g., frequency coverage gaps, such as those which may result from self-induced destructive interference as with standard sweeping and/or weighted sweeping techniques), if any, in the candidate jamming code. This is discussed in detail below with reference to block 103.

As will be appreciated, in some cases, and in accordance with an embodiment, Fourier analysis may permit more expeditious assessment and consequent refinement of a given jamming code, for example, in a laboratory/testing context (e.g., outside of an engagement scenario). However, the claimed invention is not so limited; for instance, in some cases, and in accordance with an embodiment, techniques disclosed herein may be implemented real-time by an IRCM/DIRCM system (e.g., by on-board logic/componentry, such as via a processor of a countermeasure system as in FIG. 1A) to achieve, for example, real-time assessment and/or refinement/optimization of a given jamming code within the window of engagement (e.g., a jamming code may be produced real-time which is tailored to the spectral response curve of one or more missiles/threats). Other suitable implementations of embodiments of the present invention will depend on a given application and will be apparent in light of this disclosure.

Returning to the process flow of FIG. 1, if the performance of the candidate jamming code is acceptable in the first instance, then a choice may be made as to whether to: (1) deploy the jamming code (e.g., in the field, for use in an engagement scenario with an IR-seeking missile/threat), as in block 105; or (2) optionally perform additional testing on the jamming code (e.g., in a laboratory or other testing/analysis environment) before such field deployment, as in block 104. However, if the candidate jamming code does not perform at an acceptable level in the first instance (e.g., block 102) and/or after additional optional testing (e.g., block 104), then further Fourier analysis of the individual jamming code segments of the candidate jamming code may be performed, as now discussed with reference to block 103.

As in block 103, perform Fourier analysis (e.g., via a processor of a countermeasure system, as in FIG. 1A) of one or more of the constituent code segments of the candidate jamming code to identify weak code segments. In some embodiments, Fourier analysis may be applied to specific weak code segments/frequencies in question and the resultant observations/data may be utilized to generate/provide a refined/tuned candidate jamming code (e.g., the process may begin once more at block 101), which better/fully approximates the missile susceptibility data/curve (and/or otherwise meets desired criteria/constraints). As will be appreciated, and in accordance with an embodiment, the refined/tuned candidate jamming code may be more efficient in time and/or power, as previously noted.

In some cases, Fourier analysis may demonstrate, for example, that the duration of one or more code segments of the candidate jamming code is longer than is necessary to achieve OBL of a given missile/threat. Thus, and in accordance with an embodiment, Fourier analysis may be implemented to identify protracted code segments which may be reduced in length without reducing effectiveness in achieving OBL. For instance, in one specific example embodiment, a given code segment may be reduced to a duration in the range of about 0.25-0.5 s (e.g., less than or equal to about 0.4 s). In some cases, and in accordance with an embodiment, a reduction in the duration of one or more code segments may realize a reduction in the overall length of the jamming code and/or a reduction in the amount of time required to achieve OBL of a given missile/threat.

In some cases, Fourier analysis may demonstrate, for example, that coverage of one or more frequencies adjacent/proximate to the operational frequencies of a given missile/threat may provide sufficient or otherwise adequate frequency coverage to achieve OBL of a given missile/threat. Thus, and in accordance with an embodiment, Fourier analysis may be implemented (e.g., via a processor of a countermeasure system, as in FIG. 1A) to identify unnecessary/superfluous code segments which may be removed/avoided without reducing effectiveness in achieving OBL. In some cases, and in accordance with an embodiment, a reduction in the total quantity of code segments may realize a reduction in the overall length of the jamming code and/or a reduction in the amount of time required to achieve OBL of a given missile/threat.

In some cases, Fourier analysis may demonstrate, for example, that the spectral energy of the jamming code is not efficiently/optimally allocated. For example, Fourier analysis may demonstrate that two (or more) given independent missiles/threats may require different amounts of jamming power to successfully achieve OBL; for instance, one particular missile/threat frequency may require a comparatively higher amount of spectral energy to achieve OBL as compared to another missile/threat frequency. Thus, and in accordance with an embodiment, Fourier analysis may be implemented (e.g., via a processor of a countermeasure system, as in FIG. 1A) to identify how to more efficiently allocate spectral energy (e.g., IR energy output by an IR light source of a countermeasure system, such as that in FIG. 1A) in a given jamming code to achieve OBL. In some cases, and in accordance with an embodiment, this may allow for optimal division of power between disparate frequencies, thus ensuring that the jamming power is divided efficiently between the missile/threat frequencies.

In some cases, Fourier analysis may demonstrate, for example, that constructive and/or destructive interference frequencies are present. Thus, and in accordance with an embodiment, Fourier analysis may be implemented (e.g., via a processor of a countermeasure system, as in FIG. 1A) to compare the segment phases and/or magnitudes of the individual code segments against each other to identify constructive/destructive interference behavior. In some cases, and in accordance with an embodiment, this may provide an opportunity to: (1) minimize/eliminate frequency coverage gaps within the targeted frequency space that result from destructive interference; and/or (2) account for and leverage the constructive interference of harmonics within a given jamming code.

Numerous variations on this methodology will be apparent in light of this disclosure. As will be appreciated, and in accordance with an embodiment, each of the functional boxes (101, 102, 103, 104, and 105) and decision points shown in FIG. 1 can be implemented as a module or sub-module that, when executed by one or more processors (e.g., via a processor of a countermeasure system, as in FIG. 1A), cause the associated functionality as described herein to be carried out. Also, in one specific example embodiment, the modules/sub-modules may be implemented in gate level logic (e.g., field programmable gate array or purpose-built silicon). In some embodiments, the modules/sub-modules may be implemented as one or more embedded routines of a microcontroller-based device configured to solicit input from a user and/or provide a response to user input.

Example Implementation Data

Figure 2A:
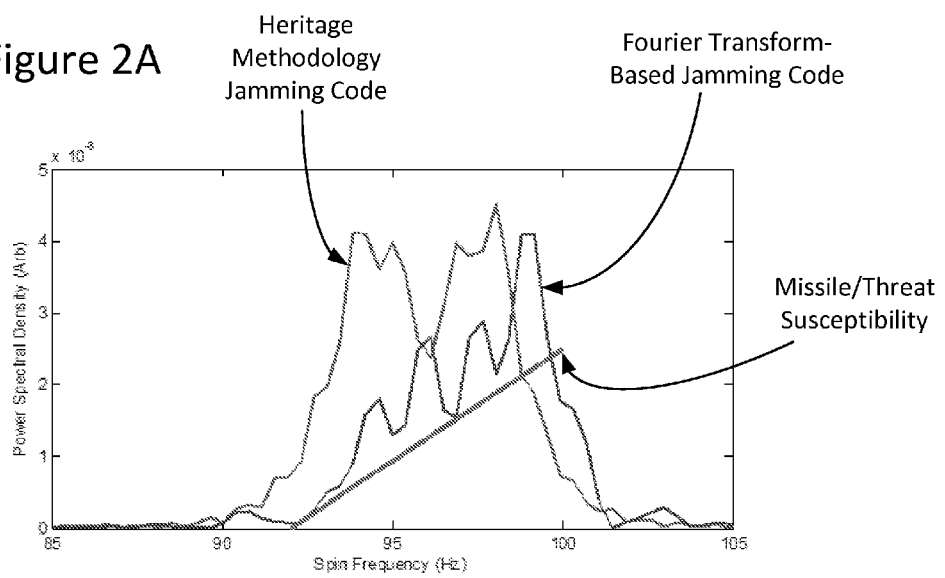
FIG. 2A is a graph of simulated data showing power spectral density as a function of spin frequency and comparing a heritage methodology jamming code with an example Fourier transform-based jamming code generated in accordance with an embodiment of the present invention.
Figure 2B:
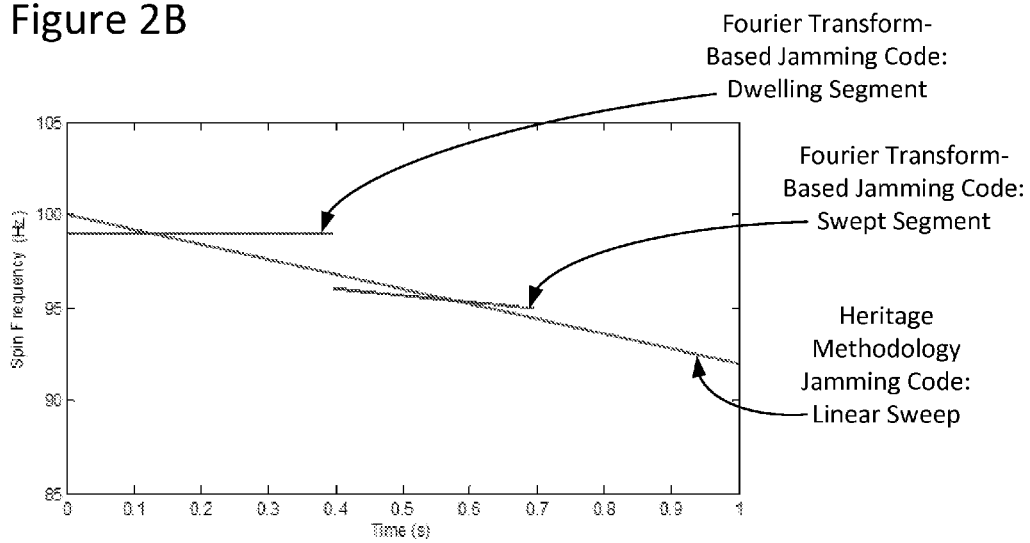
FIG. 2B is a graph of simulated data showing spin frequency as a function of time and comparing a heritage methodology jamming code with an example Fourier transform-based jamming code generated in accordance with an embodiment of the present invention.

FIG. 2A is a graph of simulated data showing power spectral density as a function of spin frequency and comparing a heritage methodology jamming code with an example Fourier transform-based jamming code generated in accordance with an embodiment of the present invention. FIG. 2B is a graph of simulated data showing spin frequency as a function of time and comparing a heritage methodology jamming code with an example Fourier transform-based jamming code generated in accordance with an embodiment of the present invention.

In the example context of FIGS. 2A and 2B, a given missile/threat may have a spin frequency that requires, for instance, linearly increasing IR energy from 92-100 Hz, as represented by the solid line/curve in FIG. 2A labeled Missile/Threat Susceptibility. As previously noted, heritage methodologies (e.g., which utilize standard/weighted sweeping techniques to produce jamming codes) typically operate under the supposition that all frequencies of operation for a given missile/threat must be swept through by the jamming code in a linear fashion. Therefore, as demonstrated in FIG. 2B, heritage methodologies may call for utilizing a single linear sweep, for example, from 100 Hz down to 92 Hz over a period of about 1.0 s in an attempt to address the missile/threat, as represented by the solid line in FIG. 2B labeled Heritage Methodology Jamming Code: Linear Sweep. However, as can be seen by comparison of the Missile/Threat Susceptibility curve and the Heritage Methodology Jamming Code curve of FIG. 2A, such a single linear sweep may result in: (1) insufficient output power at higher frequencies (e.g., note that the Heritage Methodology Jamming Code curve intersects the Missile/Threat Susceptibility curve well short of the upper end thereof, leaving 98-100 Hz unaddressed); and (2) a substantial excess/waste of power at lower frequencies (e.g., note the significant difference in magnitudes of the Heritage Methodology Jamming Code curve and the Missile/Threat Susceptibility curve in the span of 92-96 Hz). As will further be appreciated, such heritage jamming codes often suffer from incomplete (e.g., less than full) coverage of the frequency band as a consequence of frequency coverage gaps within the targeted frequency space, oftentimes at unanticipated locations (e.g., as a result of self-induced destructive interference of the heritage jamming code).

Returning to FIG. 2B, the segmented line labeled Fourier Transform-Based Jamming Code represents an example jamming code produced by implementing Fourier analysis techniques disclosed herein, in accordance with a specific example embodiment. As can be seen, the example jamming code includes a Dwelling Segment (e.g., held constant at about 99 Hz) which is to be emitted for a given period of time (e.g., less than about 0.4 s) followed by a Swept Segment (e.g., swept from about 96 Hz to about 95 Hz) for another given period of time (e.g., less than about 0.3 s).

Turning now to FIG. 2A, as can be seen by comparison of the Missile/Threat Susceptibility curve and the Fourier Transform-Based Jamming Code curve, the example jamming code produced in accordance with an example embodiment results in: (1) better coverage of the spectral requirement of the missile/threat than is achieved by the heritage methodology, notably at higher frequencies (e.g., the Fourier Transform-Based Jamming Code curve intersects the Missile/Threat Susceptibility curve substantially closer to the upper end thereof, and in practice any remaining/unaddressed portion/gap may be covered with more laser power); (2) a better match to the spectral requirement of the missile/threat (e.g., the differences in magnitudes of the Fourier Transform-Based Jamming Code curve and the Missile/Threat Susceptibility curve are smaller, and so there is less excess/wasted power); (3) fewer non-complying frequencies (e.g., by ensuring that separate segments of the jamming code intended to target different missile/threat frequencies do not destructively interfere with one another); and/or (4) as can be seen in FIG. 2B, an overall shorter jamming code duration (e.g., the example jamming code length is only about 0.7 s, which is less than that of the Heritage Methodology Jamming Code: Linear Sweep of about 1.0 s).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer-implemented method of producing a missile jamming code, the method comprising:
    analyzing a candidate missile jamming code by performing, via a processor, a Fourier transform or a fast Fourier transform (FFT) thereof to produce a frequency spectrum therefrom; and
    estimating a response of a missile to the candidate missile jamming code by comparing, via the processor, susceptibility data of the missile to the frequency spectrum of the candidate missile jamming code.

2. The method of claim 1, wherein the candidate missile jamming code is provided based on at least one of:
    power constraints of a countermeasure system configured to implement the candidate missile jamming code;
    time constraints of a countermeasure system configured to implement the candidate missile jamming code;
    the missile to which the candidate missile jamming code will be applied; and
    the susceptibility data of the missile.

3. The method of claim 1, wherein comparing susceptibility data of the missile to the frequency spectrum of the candidate missile jamming code comprises:
    comparing, via the processor, frequency spectrum magnitude to susceptibility data of the missile across a frequency band of interest.

4. The method of claim 1, wherein the missile comprises a short-wavelength infrared (SWIR)-seeking missile or a mid-wavelength infrared (MWIR)-seeking missile.

5. The method of claim 1 further comprising:
    analyzing the candidate missile jamming code by performing, via the processor, a Fourier transform or a FFT of one or more code segments of the candidate missile jamming code.

6. The method of claim 5 further comprising:
    comparing, via the processor, at least one of segment phases and magnitudes of the one or more code segments against each other to identify at least one of constructive and destructive interference behavior.

7. The method of claim 6 further comprising:
    adjusting the candidate missile jamming code based on results of the Fourier transform or FFT of the one or more code segments thereof to produce a refined missile jamming code.

8. The method of claim 7, wherein the refined missile jamming code is of shorter duration than the candidate missile jamming code.

9. The method of claim 7, wherein the refined missile jamming code is of different spectral energy allocation than the candidate missile jamming code.

10. The method of claim 7, wherein the refined missile jamming code has no gaps in frequency coverage caused by destructive interference.

11. The method of claim 7, wherein the refined missile jamming code at least one of:
   reduces the time required to achieve optical break-lock (OBL) of the missile;
   reduces the output power required to achieve OBL of the missile; and
   increases the likelihood of achieving OBL of the missile.

12. The method of claim 7 further comprising:
   analyzing the refined missile jamming code by performing, via the processor, a Fourier transform or a FFT thereof.

13. A non-transitory computer-readable medium for storing executable instructions thereon that, when executed by one or more processors, causes a process for producing a missile jamming code to be carried out, the process comprising:
   analyzing a candidate missile jamming code by performing, via a processor, a Fourier transform or a fast Fourier transform (FFT) thereof to produce a frequency spectrum therefrom; and
   estimating a response of a missile to the candidate missile jamming code by comparing, via the processor, susceptibility data of the missile to the frequency spectrum of the candidate missile jamming code.

14. The non-transitory computer-readable medium of claim 13, wherein comparing susceptibility data of the missile to the frequency spectrum of the candidate missile jamming code comprises:
   comparing, via the processor, frequency spectrum magnitude to susceptibility data of the missile across a frequency band of interest.

15. The non-transitory computer-readable medium of claim 13, wherein the process further comprises:
   analyzing the candidate missile jamming code by performing, via the processor, a Fourier transform or a FFT of one or more code segments of the candidate missile jamming code.

16. The non-transitory computer-readable medium of claim 15, wherein the process further comprises:
   comparing, via the processor, at least one of segment phases and magnitudes of the one or more code segments against each other to identify at least one of constructive and destructive interference behavior.

17. The non-transitory computer-readable medium of claim 16, wherein the process further comprises:
   adjusting the candidate missile jamming code based on results of the Fourier transform or FFT of the one or more code segments thereof to produce a refined missile jamming code.

18. The non-transitory computer-readable medium of claim 17, wherein the process further comprises:
   analyzing the refined missile jamming code by performing, via the processor, a Fourier transform or a FFT thereof.

19. An infrared countermeasures system comprising:
   a processor configured to:
      analyze a candidate missile jamming code by performing a Fourier transform or a fast Fourier transform (FFT) thereof to produce a frequency spectrum therefrom; and
      estimate a response of an infrared-seeking missile to the candidate missile jamming code by comparing susceptibility data of the missile to the frequency spectrum of the candidate missile jamming code; and
   an infrared (IR) light source configured to emit a beam of IR energy that is modulated using the candidate missile jamming code.

20. The system of claim 19, wherein:
   the processor is further configured to:
      analyze the candidate missile jamming code by performing a Fourier transform or a FFT of one or more code segments of the candidate missile jamming code;
      compare at least one of segment phases and magnitudes of the one or more code segments against each other to identify at least one of constructive and destructive interference behavior; and
      adjust the candidate missile jamming code based on results of the Fourier transform or FFT of the one or more code segments thereof to produce a refined missile jamming code that at least one of:
         reduces the time required to achieve optical break-lock (OBL) of the missile;
         reduces the output power required to achieve OBL of the missile; and
         increases the likelihood of achieving OBL of the missile; and
   the IR light source is configured to emit a beam of IR energy that is modulated using the refined missile jamming code.

* * * * *